United States Patent [19]
Houghtaling

[11] Patent Number: 5,829,537
[45] Date of Patent: Nov. 3, 1998

[54] CLAY COURT SCARIFIER

[75] Inventor: James Vernon Houghtaling, Sarasota, Fla.

[73] Assignee: Welch Tennis Courts, Inc., St. Petersburg, Fla.

[21] Appl. No.: 734,537

[22] Filed: Oct. 21, 1996

[51] Int. Cl.⁶ .................................................. A01B 21/02
[52] U.S. Cl. .......................... 172/540; 172/525; 172/669; 172/776; 172/123; 172/124; 172/120
[58] Field of Search ..................................... 172/518, 520, 172/525, 537, 540, 669, 776, 197, 445.1, 177, 532, 118, 119, 120, 122, 123, 124; 171/95, 97, 116, 128; 111/159

[56] References Cited

U.S. PATENT DOCUMENTS

| | | | |
|---|---|---|---|
| 795,699 | 7/1905 | Haynie | 172/520 |
| 923,431 | 6/1909 | Hessenauger | 172/537 |
| 1,570,582 | 1/1926 | Thompson | 172/537 |
| 1,645,994 | 10/1927 | Lloyd | 172/537 |
| 1,724,363 | 8/1929 | Reed | 172/537 X |
| 2,282,984 | 5/1942 | Maresch | 172/555 |
| 2,513,165 | 6/1950 | Gilreath | 172/537 |
| 2,553,356 | 5/1951 | Cady | 172/520 |
| 3,078,928 | 2/1963 | Brown et al. | 172/189 |
| 3,090,447 | 5/1963 | Hotchkiss, Jr. | 172/198 X |
| 3,718,192 | 2/1973 | Rogers | 172/669 X |
| 3,999,814 | 12/1976 | Miller | 172/518 X |
| 4,047,574 | 9/1977 | Foreman | 172/200 X |
| 4,202,562 | 5/1980 | Sorenson | 280/415 R |
| 4,223,742 | 9/1980 | Stark | 172/537 X |
| 4,896,732 | 1/1990 | Stark | 172/662 X |

*Primary Examiner*—Terry Lee Melius
*Assistant Examiner*—Victor Batson
*Attorney, Agent, or Firm*—McDermott, Will & Emery

[57] ABSTRACT

A clay surface scarifier includes a portable frame with a first axle and a second axle rotationally connected thereto. At least one scarifying blade, having a cutting edge orthogonal to the first axis, is attached to the first axle and rotatable therewith about the first axis. At least one scarifying blade, having a cutting edge orthogonal to the second axis, is attached to the second axle and rotatable therewith about the second axis. The axes of rotation of the first and second axles are intersecting.

2 Claims, 4 Drawing Sheets

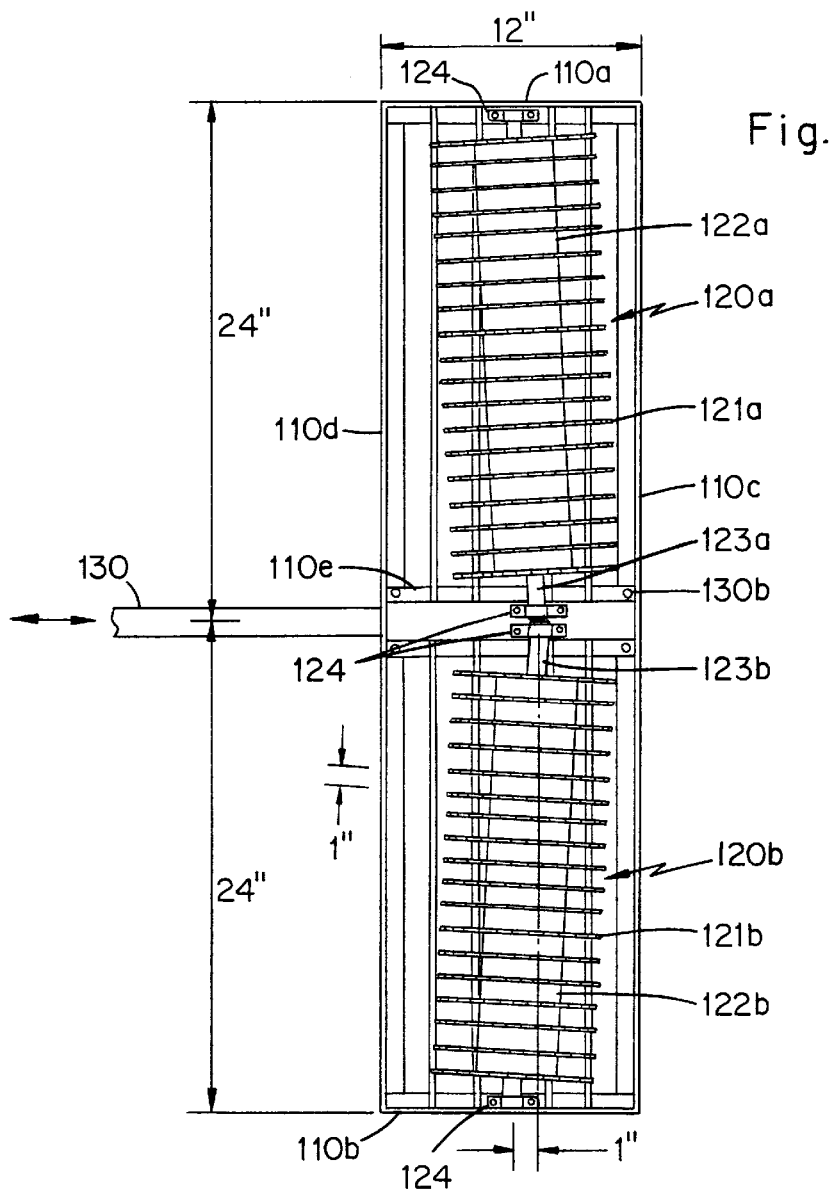
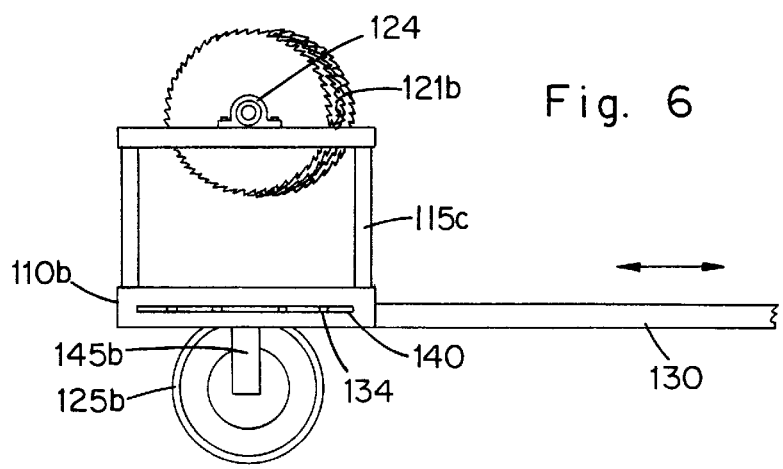

CLAY COURT SCARIFIER

TECHNICAL FIELD

The present invention relates to clay (fast dry) court maintenance and more particularly to a device for scarifying the surface of clay tennis courts.

BACKGROUND ART

Clay provides an excellent surface for numerous activities. For example, clay has been used as a tennis court surface for many years.

Tennis balls are light in weight and their play is dependent upon the court's surface. Ideally, the tennis court surface will be smooth and flat and of uniform consistency.

Clay court surfaces must be maintained to ensure that the surfaces do not dry out. Hence, the surfaces must be constantly moisturized either by rain, or by spraying water onto the surface or by sub irrigating the court. This continuous moisturizing of clay court surfaces, particularly fast drying clay court surfaces, often results in the build-up of mineral deposits, mold, algae and fungus on the clay surface. The build-of of such deposits or growths can affect the play of the tennis ball on the surface and hence is unacceptable to tennis players.

One of the difficulties in removing such deposits and growths is that tennis courts are lined to define the playing areas. Typically, the lines are made by nailing white plastic tape strips along the sides and other portions of the tennis court playing area. These lines cannot be easily removed from the court. Thus, the removal of any deposits or growths on the court must be performed without damaging the existing line tapes.

OBJECTIVES

It is an object of the present invention to provide a device for scarifying clay surfaces, such as clay tennis court surfaces, to prevent the build up of algae, mineral deposits, mold and/or fungus.

It is another object of the present invention to provide a light weight clay surface scarifier, which is easily transportable either by hand or using a small motorized vehicle.

It is still another object of the present invention to provide a device for scarifying clay tennis court surfaces without damaging existing line tapes.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

The clay surface scarifier according to the present invention has a portable frame with one or more axles rotationally connected thereto. At least one planar scarifying blade, with a toothed outer cutting edge, is attached to each axle so as to be rotatable therewith about the axis of rotation of the axle. Each of the blades is disposed in a plane which is non-parallel to the direction of travel.

Preferably, two axles, arranged either adjacent to each other or in tandem, are rotationally connected to the frame. The cutting edge of the blades attached to the respective axles may be the same; however, beneficially, the blade(s) attached to one axle are disposed in a plane which is non-parallel to the plane of the blade(s) attached to the other axle. In one arrangement with adjacent axles, the planes of corresponding blades attached to the respective axles will intersect at an intersection line and be equally angled in opposed radial directions from a line extending in the direction of travel from the intersection line.

The blades may be arranged orthogonal to the axis of rotation of the axle to which they are attached, with the rotational axes of the axles arranged to intersect and have an angular separation. The angular separation may advantageously be in the range of 174° to 176°, e.g. each axle may be offset approximately one inch for every two feet in length. Preferably, the axes are equally angled in opposed radial directions from a line extending in the direction of travel of the frame and passing through at the intersection point of the axes.

If adjacent axles are utilized, the ends of one axle are typically supported by bearings mounted proximate to left side and the middle of the frame. The ends of the other axle are supported by bearings mounted proximate to the right side and the middle of the frame.

Beneficially, a plurality of circular planar blades are attached to each axle and each having a toothed outer cutting edge with multiple teeth spaced circumferentially along a radial outer edge of the blade. A tow member may be mounted to the frame so as to extend in the direction of travel of the frame, which is typically frontward and backward. Preferably, the tow member is removable from the frame. Application of a force to the tow member with the toothed outer cutting edge(s) of the scarifying blade(s) in contact with a clay surface will cause rotation of the blades over the surface to scarify the clay surface as the frame moves in the direction of travel.

Preferably, the axle(s) are mounted so as to extend away from the frame in one direction, and at least one, but preferably two, wheels are rotationally connected to the frame and mounted so as to extend away from the frame in an opposite direction. If two wheels are provided, one wheel may be rotationally connected to a mount proximate to the right side of the frame and the other wheel rotationally connected to a mount proximate to the left side of the frame.

With the axle(s) and wheel(s) mounted in the above described manner, the scarifier will operate such that in a first orientation, the toothed outer cutting edge(s) of the scarifying blade(s) makes contact with the ground surface and application of a force to the frame causes the blades to rotate over the ground surface as the frame moves in the direction of travel to thereby scarify the ground surface. In a second orientation, the wheel(s) make contact with the ground surface and application of a force to the frame causes the wheel(s) to rotate over the ground surface as the frame moves in the direction of travel without scarifying the ground surface.

One or more support members may be connected to extend between the sides of the frame to support a load with the frame in the first orientation. The load will put additional weight on the toothed outer cutting edge(s) making contact with the ground surface to increase scarification of the ground surface during rotation of the scarifying blade(s).

BRIEF DESCRIPTION OF DRAWINGS

FIG. 3 is a bottom view of the clay court scarifier depicted in FIG. 1A.

FIG. 6 is a side view of the clay court scarifier depicted in FIG. 1A after rotation of the scarifier to the second orientation shown in FIG. 1B.

DESCRIPTION OF THE PREFERRED EMBODIMENT

Figure 1A:
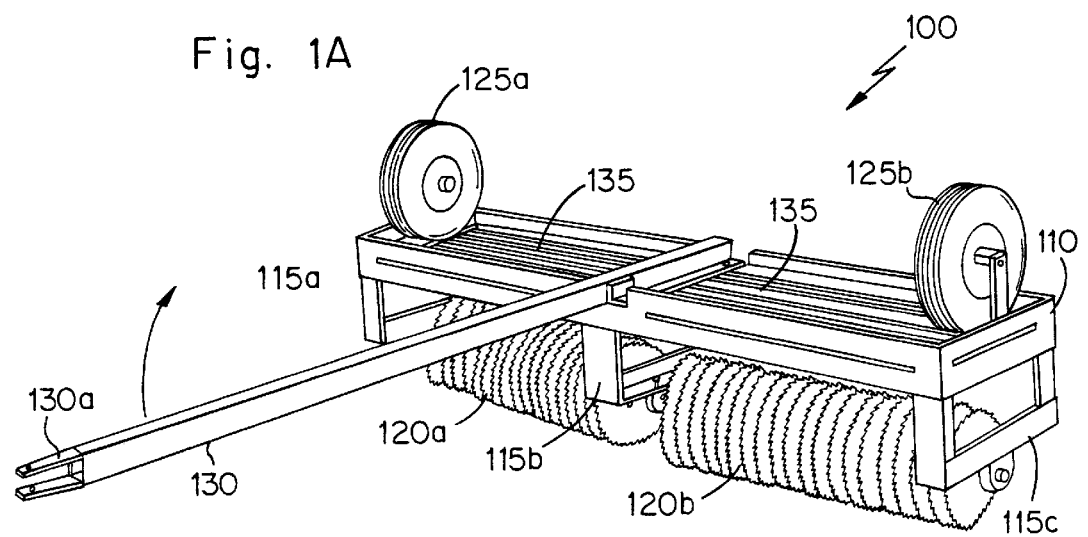
FIG. 1A is a perspective view of a clay court scarifier in accordance with the present invention.

FIG. 1A depicts a perspective view of a clay court scarifier 100 in accordance with the present invention. As depicted, the scarifier 100 includes a frame 110 which is formed of angled high strength steel, but could be formed of other shapes or other materials. Extending from the frame 110 are mounting brackets 115a, 115b and 115c. The brackets are welded to the frame 110 but could alternatively be bolted or riveted, if desired. The brackets support blade assemblies 120a and 120b which are rotationally connected via the brackets to the frame.

Also connected to the frame are two wheels 125a and 125b. A tow bar 130 is attached with bolts to the frame 110 so as to be removable for shipment and storage. It will be understood that the tow bar 130 could be permanently attached to the frame 110, if desired. The tow bar includes a connector portion 130a which can be used to attach the scarifier 100 to a tow vehicle or to a handle bar useful in moving the scarifier 100 by hand. Extending between the sides of the frame 110 are steel support bars 135 which are provided to support bags of sand or pebbles or another type load to increase the weight on the blade assemblies 120a and 120b during scarifying.

As depicted in FIG. 1A, the scarifier 100 is in a first orientation. In this orientation, the frame 110 is disposed horizontally with the blade assemblies 120a and 120b extending downward from the frame so as to be in contact with the ground surface. The wheels 125a and 125b extend upwardly from the frame 110 and hence, in the opposite direction of the blade assemblies 120a and 120b. In this orientation, by pushing or pulling on the tow bar 130, the blade assemblies 120a and 120b will freely rotate on the ground surface while the scarifier 100 is pulled frontward or pushed backward, thereby scarifying the ground surface. As indicated by the arrow extending from the tow bar 130, the scarifier 100 can be rotated to a second orientation which is depicted in FIG. 1B.

Figure 1B:
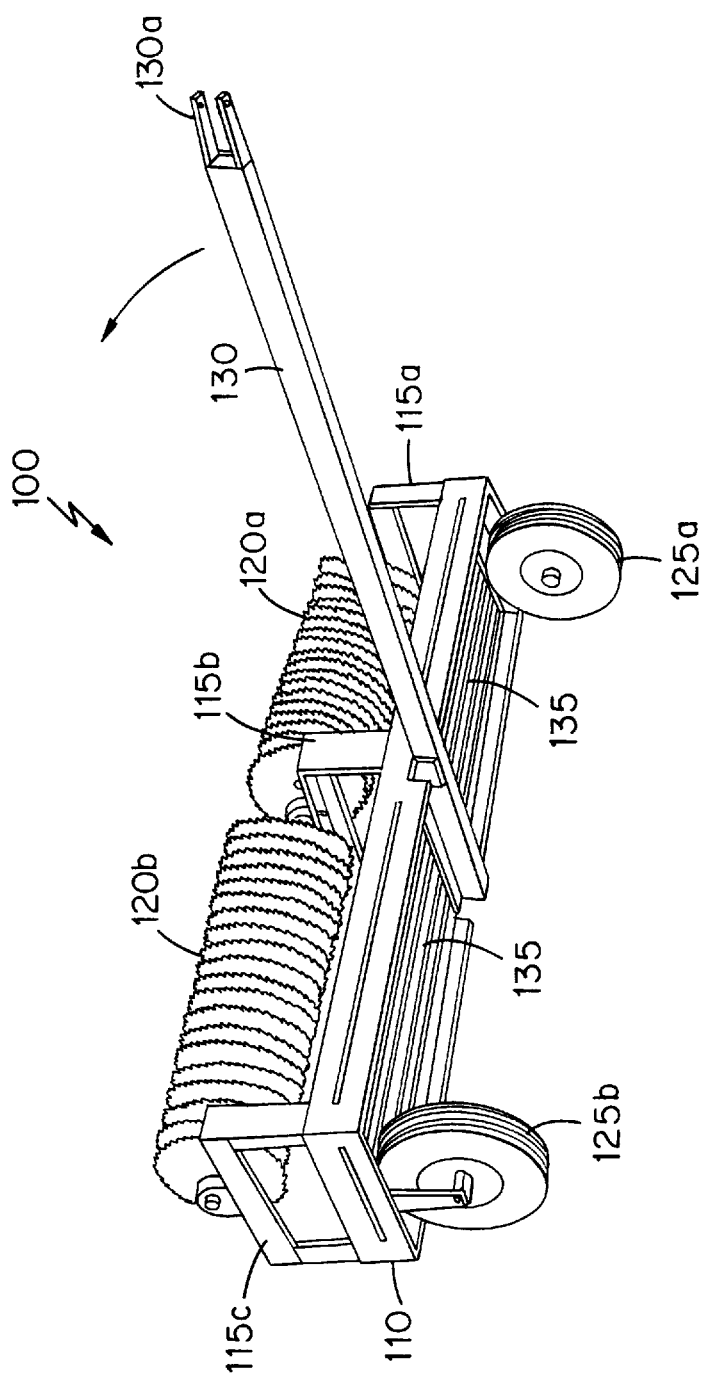
FIG. 1B is a perspective view of the clay court scarifier of FIG. 1A in a second orientation.

As shown in FIG. 1B in the second orientation, the wheels 125a and 125b are in contact with the ground surface while the blade assemblies 120a and 120b extend upwardly away from the ground surface. In this second orientation, the scarifier 100 can be pulled or pushed using the tow bar 130 to move the scarifier frontward or backward over the ground surface without scarifying the surface.

Figure 2:
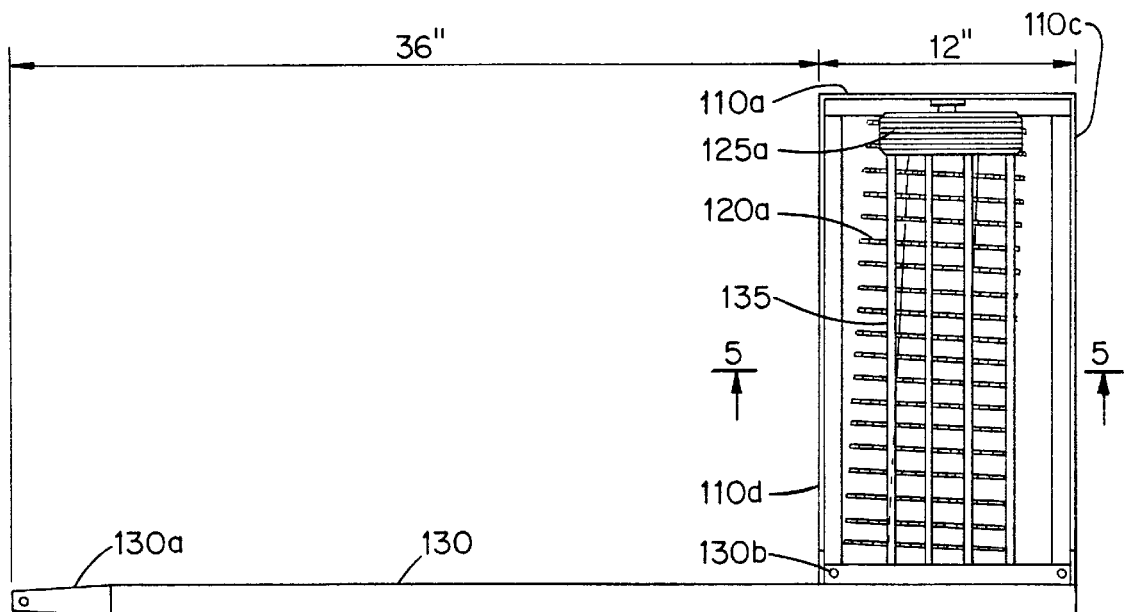
FIG. 2 is a top view of the clay court scarifier depicted in FIG. 1A.

Referring now to FIG. 2, a top view of the scarifier lo depicted in FIG. 1A is shown. As indicated, the support bars 135 are flat plates which are welded to the side angles 110a and 110b of the frame 110. The support bars 135 are also welded to the frame center angle members, referenced in FIG. 3 as 110e, which extend between the front and rear angle members 110c and 111d of the frame 110. The tow bar 130 is bolted by bolts 130b to the center angle members 110e as indicated. The center angle members 110e and tow bar 130 are advantageously located an equi-distance from the right and left sides, respectively 110a and 110b of the frame 110. As shown, the tow bar 130 extends thirty-six inches from the frame 110 so as to be disposed generally in line with the directions in which the frame is capable of traveling, i.e., frontward or backward. The tow bar 130 has a total length of forty-eight inches and the frame 110 has a width of twelve inches.

FIG. 3 depicts a bottom view of the scarifier 100, as shown in FIG. 1A. As shown, the blade assemblies 120a and 120b are formed of a plurality of blades 121a and 121b, which are equally spaced on one inch centers by spacers 122a and 122b along axles 123a and 123b. The one inch spacing is not mandatory. The cutting edges of the blades 121a and 121b are toothed and resemble standard circular saw blades. Preferably, the blades are seven and one-half inches in diameter but could be of another diameter if desired.

The axle 123a is rotationally supported by bearings 124 which are attached by bolts to the angled members 110a on the right side of the frame and the angled members 110e in the middle of the frame 110. Axle 123b is rotationally supported by bearings 124 which are attached by bolts to the angled members 110b on the left side of the frame 110 and angled members 110e located in the middle of the frame 110. The two bearings 124 supporting each axle 123a and 123b are attached to the frame so as to be offset by one inch in the front to rear direction. Each axle 123a and 123b is approximately twenty-four inches in length and the frame 110 has a total width of approximately forty-eight inches.

Accordingly, the axles 123a and 123b are not parallel and the axes of rotation of the respective axles 123a and 123b will intersect. As shown, the axles are angled from one another at approximately 174° to 176° on the front side or 184° to 186° on the back side, i.e., each axle is sloped 2° to 3° with respect to a horizontal line orthogonal to the direction of travel of the scarifier. This results in the planar blades 121a and 121b being non-parallel with the frontward or backward travel of the scarifier 100 indicated by the arrows shown in FIG. 3. It will be recognized, that if desired, the axles could be made parallel and the blades themselves formed, for example, in a spiral type pattern so as to be non-parallel with the direction of travel of the scarifier.

Figure 4:
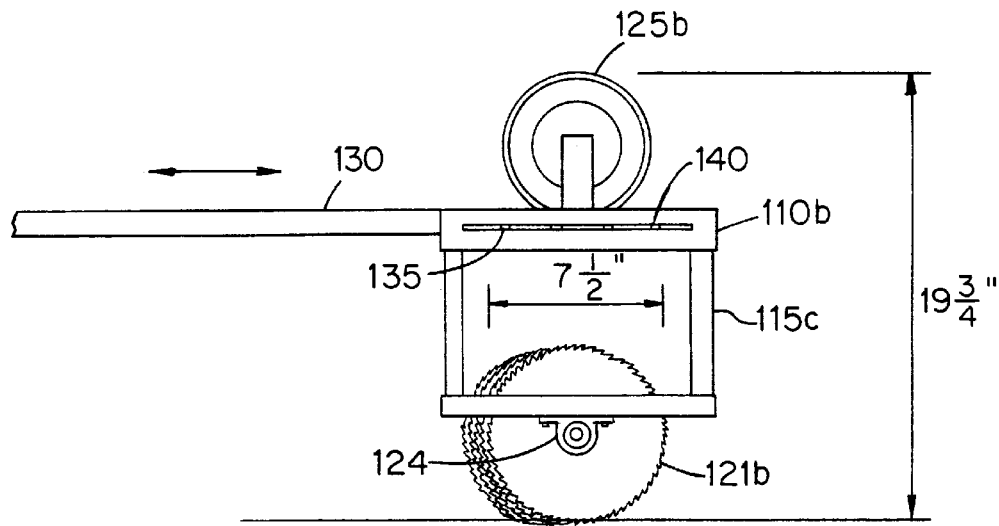
FIG. 4 is a side view of the clay court scarifier depicted in FIG. 1A.

FIG. 4 depicts a side view of the clay court scarifier 100 shown in FIG. 1A. As indicated, the scarifier 100 has a total height of approximately nineteen and three-quarters inches, although this could vary depending on the application. The blades 121a and 121b are seven and one-half inches in diameter. When the scarifier 100 is pulled in a frontward direction, the scarifier blades 121a and 121b rotate in a counterclockwise direction with the end of each tooth trailing the remainder of the tooth as the cutting edge contacts the ground surface. When the scarifier is pushed in a backward direction, the blades 121a and 121b rotate in a clockwise direction with the end of each tooth making the initial contact with the ground surface. The blades 121a and 121b, of course, could be reversed so that the end of each tooth would be the initial contact point when the scarifier 100 is pulled frontward and the trailing contact point when the scarifier 100 is pushed backward. The support members 135 extend into a slot 140 formed between the angle side members 110b of the frame 110. The support members 135 are spot welded to the angled members 110b. The other side of the frame 110 is similar.

Figure 5:
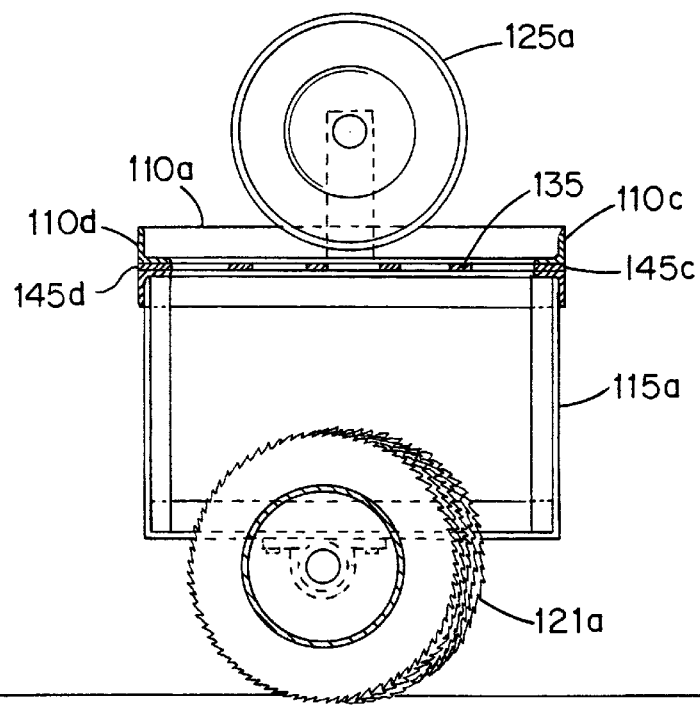
FIG. 5 is a cross-section of the clay court scarifier depicted in FIG. 1A.

FIG. 5 is a view of the scarifier 100 cut through the section indicated in FIG. 2. As shown, the front and back angled frame members 110c and 110d are formed of back to back angles which are welded together at their ends by welds 145c and 145d. The angled frame side members 110a and 110b are likewise formed and welded.

The side welds on the angle side members 110a and 110b are terminated a short distance from each end so as to leave the slot 140 shown in FIG. 4 in the side members. Similarly, the front and rear angle members are welded for only a short distance from the ends and a short distance in the middle to provide the necessary structural coupling between the angled members forming the frame 110. The blade mounts 115a, etc. can be welded or bolted to the front, rear, center and/or side angled members 110a–110e.

FIG. 6 is a side view of the scarifier 100 orientated as shown in FIG. 1B. In this orientation, the scarifier can be transported over the ground surface without scarifying the surface.

As shown, the scarifier can be moved frontwards or backwards by pulling or pushing on the tow bar 130 to cause the wheels to rotate over the ground surface. The wheel mount 145b is sufficiently long to ensure that the wheel 125b rotates freely without interference from the frame 110. A substantially identical mount spaces the other wheel 125a from the frame 110.

As described in detail above, the clay surface scarifier according to the present invention can be moved frontward or rearward in one orientation to scarify a clay court surface and in another orientation to transport the scarifier without scarifying the surface or damaging the blades. The described scarifier is light weight, easily transportable and can be used to prevent the build up of algae, mineral deposits, mold and/or fungus on clay surfaces, such as clay tennis courts, without damaging existing line tapes.

It will be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. clay surface scarifying, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

I claim:

1. A clay surface scarifier, comprising:

a single rigid frame configured to move frontward and rearward and having a front side, a rear side, a left side, a right side, and a middle portion equi-distanced from said left side and said right side, the sides defining a generally horizontal plane;

a first axle having a first axis of rotation;

a second axle having a second axis of rotation;

a plurality of circular planar scarifying blades, each having multiple scarifying teeth spaced along a radial outer edge thereof, attached to said first axle and rotatable therewith;

a plurality of circular planar scarifying blades, each having multiple scarifying teeth spaced along a radial outer edge thereof, attached to said second axle and rotatable therewith;

a first bearing mounted to the frame and rotationally connecting a first end of said first axle to said frame so as to extend vertically away from the frame in a first direction;

a second bearing mounted to the frame and rotationally connecting an opposed second end of said first axle to the frame so as to extend away from the frame in the first direction;

a third bearing mounted to the frame and rotationally connecting a first end of the second axle to said frame so as to extend away from the frame in the first direction;

a fourth bearing mounted to the frame and rotationally connecting an opposed second end of said second axle to said frame so as to extend away from the frame in the first direction;

a first wheel rotationally mounted to the frame, proximate to the right side thereof, so as to extend vertically away from the frame in a second direction, opposite the first direction; and a second wheel rotationally mounted to the frame, proximate the left side thereof, so as to extend away from the frame in the second direction;

a tow member mounted to said frame;

wherein, the frame is configured such that, with the frame in a first orientation, the first direction is a downward direction and the blades are configured to make contact with a ground surface and application of a force to the tow member will cause the blades to rotate as the frame moves over the ground surface to thereby scarify the ground surface and, with the frame member in a second orientation, the second direction is the downward direction and said wheels are configured to make contact with the ground surface and application of a force to the tow member will cause the wheels to rotate as the frame moves over the ground surface without scarifying the ground surface, and wherein:

the first bearing is mounted proximate to the left side of the frame;

the second bearing is mounted proximate to the middle portion of the frame;

the third bearing is mounted proximate to the right side of the frame;

the fourth bearing is mounted proximate to the middle portion of the frame; and each of said plurality of first blades is disposed along a plane which is constantly and immovably angularly offset from a travel direction of the frame and each of said plurality of second blades is disposed along a plane which is constantly and immovably angularly offset from the travel direction of the frame.

2. A scarifier according to claim 1, further comprising one or more members disposed within the sides of the frame configured to support a load with the frame in the first orientation so as to increase weight on the blades to increase scarification of the ground surface during rotation of the blades.

\* \* \* \* \*